United States Patent
Marcum (10) Patent No.: US 12,317,903 B2
(45) Date of Patent: *Jun. 3, 2025

(54) VERSATILE WARMER/SMOKER

(71) Applicant: Arnold Craig Marcum, Annapolis, MD (US)

(72) Inventor: Arnold Craig Marcum, Annapolis, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 18/401,200

(22) Filed: Dec. 29, 2023

(65) Prior Publication Data
US 2024/0130382 A1   Apr. 25, 2024

Related U.S. Application Data

(63) Continuation of application No. 16/515,603, filed on Jul. 18, 2019, now Pat. No. 11,856,962.

(51) Int. Cl.
*A23B 4/052* (2006.01)
*A47J 39/02* (2006.01)

(52) U.S. Cl.
CPC ............. *A23B 4/052* (2013.01); *A47J 39/02* (2013.01); *A47J 39/025* (2013.01); *A23V 2002/00* (2013.01); *A47J 2202/00* (2013.01)

(58) Field of Classification Search
CPC ...... A47J 39/02; A47J 39/025; A47J 2202/00; A23B 4/052; A23B 4/044
See application file for complete search history.

(56) References Cited

U.S. PATENT DOCUMENTS

| | | | | |
|---|---|---|---|---|
| 4,332,828 A | * | 6/1982 | Gallagher | A23L 5/10 99/422 |
| 4,481,408 A | * | 11/1984 | Scheufler | A47J 37/0704 126/258 |
| 5,070,777 A | * | 12/1991 | Novak | A47J 37/0786 426/314 |
| 5,176,124 A | * | 1/1993 | Wrasse | A47J 37/0704 99/473 |
| 8,001,955 B1 | * | 8/2011 | Bourgeois | F24C 3/14 126/30 |
| 2012/0225178 A1 | * | 9/2012 | Degnan | A47J 45/071 99/422 |
| 2015/0136112 A1 | * | 5/2015 | Dyson | A47J 37/0704 126/25 R |

* cited by examiner

*Primary Examiner* — Thien S Tran
(74) *Attorney, Agent, or Firm* — Robert Z. Evora, Esq.

(57) ABSTRACT

A heating/smoker device is disclosed which uses the heat and/or smoke from existing sources and uses it to heat up serveware or food, or smoke food. The heating/smoker device is durable and versatile and can adopt to virtually any heat/smoke source.

14 Claims, 6 Drawing Sheets

VERSATILE WARMER/SMOKER

This application is a continuation of U.S. patent application Ser. No. 16/515,603, filed Jul. 18, 2019; the content of which is hereby incorporated by reference herein in its entirety into this disclosure.

BACKGROUND OF THE SUBJECT DISCLOSURE

Field of the Subject Disclosure

The present subject disclosure relates to warmer/smokers. More specifically, the present subject disclosure relates to warmer/smoker devices and systems which attach to existing heating/smoking systems.

Background of the Subject Disclosure

Preparing, serving, and consuming a hot meal is one of the most pleasurable culinary activities, whether it occurs in homes, restaurants, or outdoors. Often times, the meal is prepared, cooked, and completed while it is still hot, but the time and logistics of placing the meal on a plate and serving it to a customer takes away from the temperature of the meal, leaving it less than ideal.

One solution that restaurants often use to maintain a freshly made meal at an optimum serving temperature is a heat lamp. Freshly made meals are prepared and placed on a plate, and then kept under a heat lamp until the meal is ready to serve by a server, or the customer picks up the meal. However, heat lamps add an extra duration of cooking time, and can dry out and alter the taste and freshness of food.

Thus, there exists a need to be able to provide freshly made meals to a customer with little to no temperature loss while still maintaining the flavor and texture of the meal.

SUMMARY OF THE SUBJECT DISCLOSURE

The present subject disclosure describes devices which attach to and use existing heating and smoking apparatus to heat serveware and/or smoke foods. The present subject disclosure does not use its own heat nor require additional energy use, but merely uses energy, heat, and smoke which would have been discarded to the ambient air anyway, and uses it to maintain heat and/or provide additional smoke flavor to foods.

In one exemplary embodiment, the present subject disclosure is a device for heating/smoking. The device includes a base portion having an aperture; a chamber having an aperture and attached to the base portion; wherein the chamber is placeable upon a source of heat and/or smoke, wherein heat and/or smoke generated by the source is directed through the aperture of the chamber, into the chamber, through the base aperture, and onto the base portion, to heat and/or smoke items placed thereon.

In another exemplary embodiment, the present subject disclosure is a device for heating/smoking. The device includes a base portion having an aperture and a plurality of stop walls adapted to secure a serveware or mesh placed upon the base portion; a chamber having an aperture and attached to the base portion; wherein the chamber is placeable upon a source of heat and/or smoke, wherein heat and/or smoke generated by the source is directed through the aperture of the chamber, into the chamber, through the base aperture, and onto the base, to heat and/or smoke items placed thereon.

In yet another exemplary embodiment, the present subject disclosure is a device for heating/smoking. The device includes a base portion having an aperture and three U-shaped stop walls adapted to secure a serveware or mesh placed upon the base portion, including a top stop wall a pair of side stop walls, a chamber having an aperture and attached to the base portion; wherein the chamber is placeable upon a source of heat and/or smoke, wherein heat and/or smoke generated by the source is directed through the aperture of the chamber, into the chamber, through the base aperture, and onto the base, to heat and/or smoke items placed thereon.

DETAILED DESCRIPTION OF THE SUBJECT DISCLOSURE

The present subject disclosure addresses the shortcomings of serving food on cold serveware (plates, platters, containers, etc.) which quickly drop the temperature of the hot prepared food placed thereon. Further, the present subject disclosure provides energy-free solutions to maintaining the temperature of a meal by providing heated serveware on which the meal is served, and/or adding smoke flavor to meals. The present disclosure does not require its own source of energy, and therefore is a green technology solution to addressing existing shortcomings with conventional methods of maintaining hot food temperatures. For example, the present subject disclosure does not require additional energy, such as heat lamps, over what is already being used and is durable because it does not require a power source or electricity or components for light to heat conversion (photocells, etc.). This allows for warming plates, smoking, or heating of food without having to place a plate on a burner, or opening the main smoker, causing heat loss from the interior.

Figure 1:
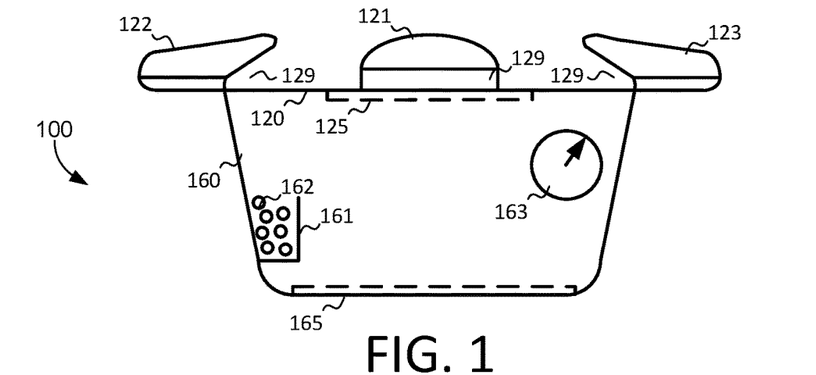
FIG. 1 shows a side view of a heater/smoker device, according to an exemplary embodiment of the present subject disclosure.
Figure 2:
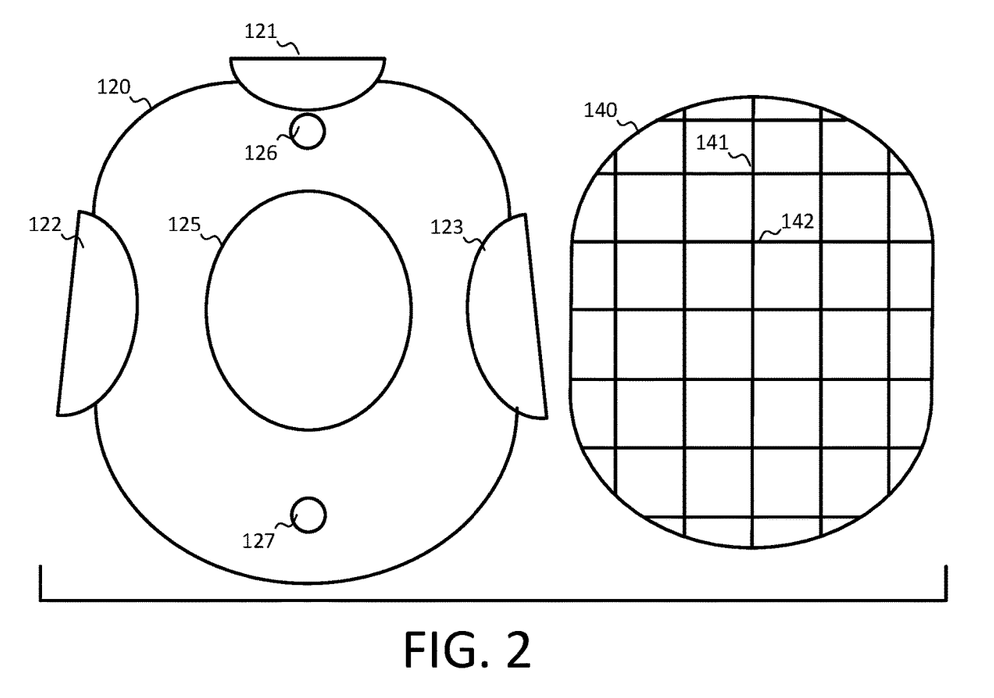
FIG. 2 shows a top view of a heater/smoker device and insertable mesh, according to an exemplary embodiment of the present subject disclosure.

FIGS. 1 and 2 show an exemplary embodiment of a combination heater/smoker device 100, according to the present subject disclosure. The device 100 is designed to be versatile, modular, and adaptable to virtually any heat and/or smoke source. The device 100 includes a substantially flat base 120 and a bottom chamber 160. The bottom chamber 160 may be attached to the base 120 at its top side through permanent (welding, gluing, etc.) or semi-permanent (bolts, clips, etc.) mechanisms. The bottom chamber 160 has a substantially flat bottom side with a large opening 165, which is adapted to fit over a heating/smoking source, such as the smoker 330 shown in FIG. 8, as will be described in detail below. The chamber 160 is shown in the examples as an oval cylinder but it may be any shape that is able to allow the device 100 to function as described in the present disclosure.

The base 120 extends over the top portion of the chamber 160. Heat and/or smoke is directed from the underneath the chamber to chamber 160 through opening 165 (FIGS. 5-7), and then through opening 125 of the base 120 onto serveware (e.g., plates) or food placed thereon. Alternatively heat and/or smoke may be directed from inside the chamber 160 (FIG. 8) up and through the opening 125 of the base 120, onto plates or foods placed thereon.

The base 120 includes one or more stop walls 121, 122, 123, including a top stop wall 121, and two side stop walls 122, 123. Each stop wall serves as a stop point for a plate or the mesh screen 140 placed on the base 120. In the examples shown, U-shaped stop walls 121, 122, 123 are shown which allows the plate or mesh screen 140 to be secured in place atop the base 120 while preventing the possibility of the plate or mesh flipping upwards or over.

As shown in FIG. 2, base 120 includes a top stop wall 121, and two stop walls 122 and 123. This allows a plate or mesh 140 to be slid onto the top surface of the base 120, and to be secured in position in the concave cavities 129 formed underneath the U-shaped stop walls 121, 122, 123. The plate or mesh 140 is inserted and removed from the lower side of the base 120, as seen from the top view shown in FIG. 2. In this embodiment, the two stop walls 122 and 123 are angled downwards so that any plate or mesh 140 placed therein can more easily be accommodated within the concave cavities 129. Alternatively, the angles of the side stop walls 122 and 123 may be movable or adjustable, as desired, to accommodate different types of plates and meshes. The adjustment of the stop walls 121, 122, 123 may be accomplished by bending the walls as needed. This may be done by constructing the walls 121, 122, and 123 of bendable, heat-resistant metal.

The base 120 has further apertures, including a top side aperture 126 and a bottom side aperture 127, which aid in preventing the sealing of a plate placed upon the base 120 surface, and also with draining of water or other fluids from spilled on the base 120 surface.

The chamber 160 has a shelf, smaller internal chamber, or pocket 161 positioned within the chamber 160, and may contain scenting and/or smoking materials 162, such as mesquite chips and the like. As heat or smoke enters the chamber 160, it interacts with the material 162 to release scents or flavors which enhance the taste of foods placed upon the base 120. A thermometer or temperature gauge 163 positioned on the wall of the chamber 160 may also be helpful when certain desired temperatures are needed for the heating and/or smoking of certain types of foods which may be more sensitive to heat. The thermometer 163 is also helpful to indicate how hot the chamber 160 is, and therefore how hot a plate placed on the base 120 may be, or what temperature any food placed on the screen mesh 140 may be exposed to. This will aid in preventing burns to the hand by indicating that a plate may be too hot to touch directly. It also aids in informing the cook that the temperature of the heater/smoker may be too high for the foods placed thereon, which may affect the quality of the food placed on the mesh screen 140.

Figure 10:
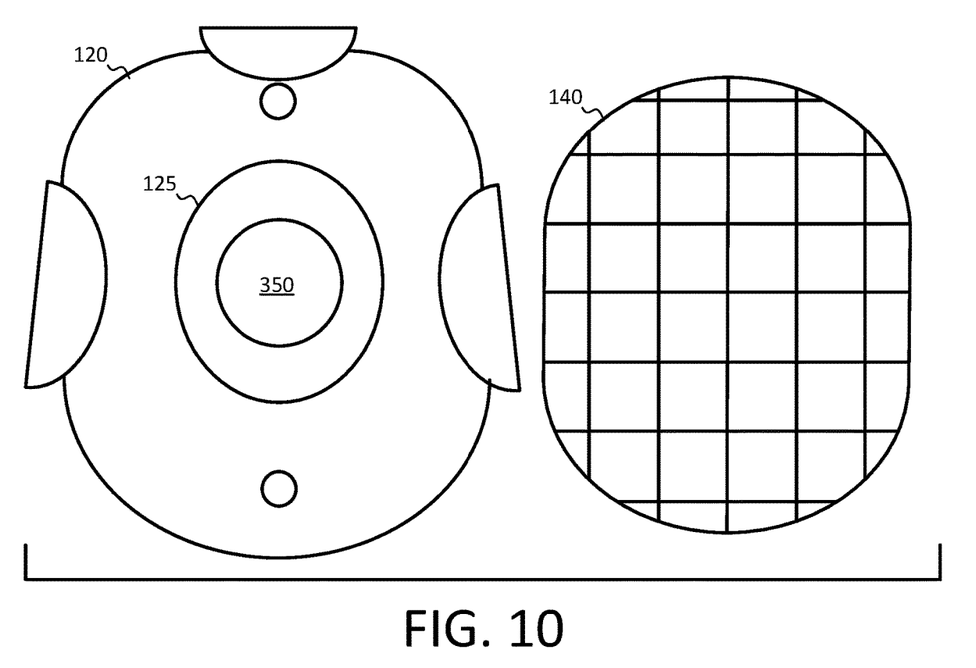
FIG. 10 shows a top view of a heater/smoker device and insertable mesh with the heater/smoker device placed atop a heat source, according to an exemplary embodiment of the present subject disclosure.
Figure 11:
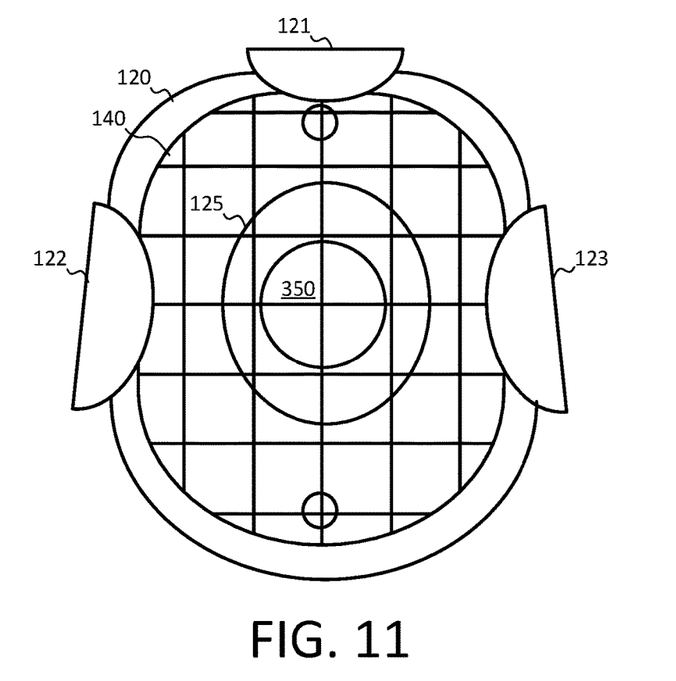
FIG. 11 shows a top view of a heater/smoker device with inserted mesh placed atop a heat source, according to an exemplary embodiment of the present subject disclosure.

The mesh screen 140 may be composed of metal, ceramic, plastic, or other material which is capable of withstanding high temperature and which does not easily melt, chip, or fracture, so that food may be placed thereon while the mesh 140 is on the base 120. The mesh 140 contains a series of vertical 141 and horizontal metallic rods or wires, which together form a surface on which food may be placed. FIGS. 10-11 show the placement of the mesh screen 140 atop the base 120, as will be described in more detail below.

The base 120, chamber 160, and mesh screen 140 may be composed of metal, heat-resistant plastic or some combination thereof, as appreciated by one having ordinary skill in the art after consideration of the present disclosure.

Figure 3:
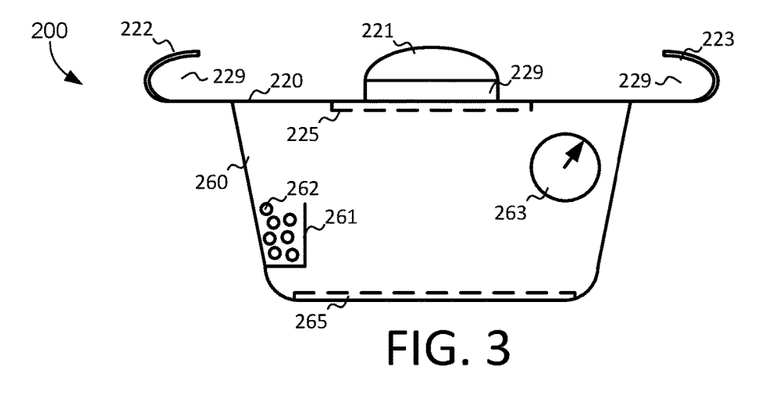
FIG. 3 shows a side view of a heater/smoker device, according to another exemplary embodiment of the present subject disclosure.
Figure 4:
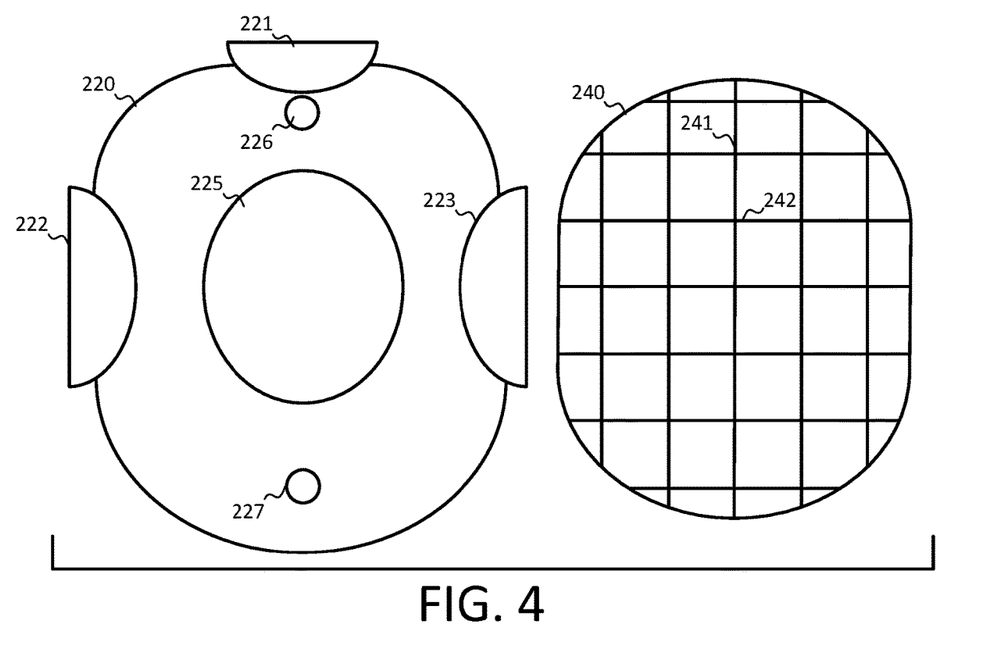
FIG. 4 shows a top view of a heater/smoker device and insertable mesh, according to another exemplary embodiment of the present subject disclosure.

FIGS. 3 and 4 show another exemplary embodiment of a combination heater/smoker device 200, according to the present subject disclosure. The exemplary device 200 shown and described in FIGS. 2-3 is substantially the same as the exemplary device 100 shown and described in FIGS. 102, but for the positioning of the side stop walls. For sake of completeness, the features and functions of the exemplary embodiment of FIGS. 2-3 will be described in detail.

The device 200 is designed to be versatile, modular, and adaptable to virtually any heat and/or smoke source. The device 200 includes a substantially flat base 220 and a bottom chamber 260. The bottom chamber 260 is attached to the base 220 at its top side through permanent (welding, gluing, etc.) or semi-permanent (bolts, clips, etc.) mechanisms. The bottom chamber 260 has a substantially flat bottom side with a large opening 265, which is adapted to fit over a heating/smoking source, such as the smoker 330 shown in FIG. 8, as will be described in detail below.

The base 220 extends over the top portion of the chamber 260. Heat and/or smoke is directed from underneath the chamber 260 through opening 265 (FIGS. 5-7) to chamber 260, and then through opening 225 of the base 220 onto plates or food placed thereon. Alternatively heat or smoke may be directed from inside the chamber 260 (FIG. 8) up and through the opening 225 of the base 220, onto plates or foods placed thereon.

The base 220 includes one or more stop walls 221, 222, 223, including a top stop wall 221, and two side stop walls 222, 223. Each stop wall serves as a stop point for a plate or the mesh screen 240 placed on the base 220. In the examples shown, U-shaped stop walls 221, 222, 223 are shown which allows the plate or mesh screen 240 to be secured in place atop the base 220 while preventing the possibility of the plate or mesh from flipping upwards or over.

As shown in FIG. 4, base 220 includes a top stop wall 221, and two stop walls 222 and 223. This allows a plate or mesh 240 to be slid onto the top surface of the base 220, and be secured in position in the concave cavities 229 formed underneath the U-shaped stop walls 221, 222, 223. The plate or mesh 240 is inserted and removed from the lower side of the base 220, as seen from the top view shown in FIG. 4. In this embodiment, the two stop walls 222 and 223 are parallel with each other so that any plate or mesh 240 placed therein would be secured tightly within the concave cavities 229.

The base 220 has further apertures, including a top side aperture 226 and a bottom side aperture 227, which aid in preventing the sealing of a plate placed upon the base 220 surface, and also with draining of water or other fluids from the base surface, such as when it rains or when condensation or other fluid is spilled on the base 220 surface.

The chamber 260 has a shelf, small chamber, or pocket 261 positioned within the chamber 260, and may contain scenting and/or smoking materials 262, such as mesquite chips or the like. As heat or smoke enters the chamber 260, it interacts with the material 262 to release scents or flavors which enhance the taste of foods placed upon the base 220. A thermometer or temperature gauge 263 positioned on the wall of the chamber 260 may also be helpful when certain desired temperatures are needed for the heating or smoking of certain types of foods which may be more sensitive to heat. The thermometer 263 is also helpful to indicate how hot the chamber 260 is, and therefore how hot a plate placed on the base 220 may be, or what temperature any food placed on the screen mesh 240 may be exposed to.

The mesh screen 240 may be composed of metal, ceramic, plastic, or other material which is capable of withstanding high temperature and which does not easily melt, chip, or fracture, so that food may be placed thereon while the mesh 240 is on the base 220. The mesh 240 contains a series of vertical 241 and horizontal metallic rods or wires, which together form a surface on which food may be placed. FIGS. 10-11 show and describe the placement of the mesh screen 240 atop the base 220 in more detail below.

The base 220, chamber 260, and mesh screen 240 may be composed of metal, heat-resistant plastic, other materials, or some combination thereof, as appreciated by one having ordinary skill in the art after consideration of the present disclosure.

One of the many novel and unique aspects of the present subject disclosure is its versatility. Virtually any source of heat or smoke may be used to generate heat and/or smoke to food or plates placed thereon. FIGS. 5-8 present merely four non-limiting examples of the use of the present subject disclosure in conjunction with various sources of heat and/or smoke.

Figure 5:
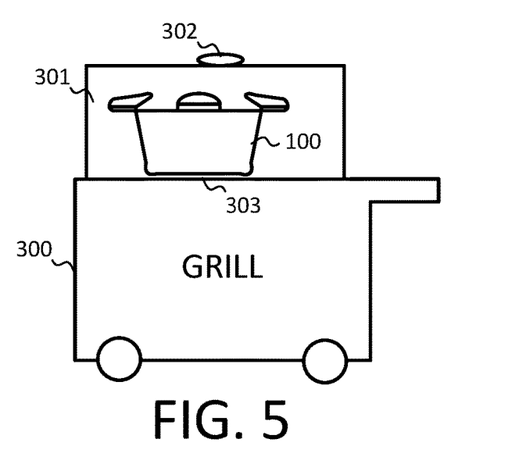
FIG. 5 shows a heater/smoker device positioned atop a grill surface, according to an exemplary embodiment of the present subject disclosure.

FIG. 5 shows the use of a device 100 according to the present subject disclosure with a conventional grill 300. A conventional grill 300 typically has a cover 301 with a handle 302, which is used to open and close the cover 301. A cooking surface 303 is where food is typically placed. In the present example, the device 100 is placed directly on the cooking surface. The grill may be gas, charcoal, wood, other, or some combination thereof. In use, the grill 300 is heated up so that the surface 303 gets hot enough to cook food thereon. The heat and/or smoke generated from heating up the grill is then directed through opening 165 into the chamber 160, and then through opening 125 of the base 120, and onto a plate or mesh screen 140 placed on the top surface of the base 120. This results in the heating and/or smoking of serveware or food placed on the base 120.

Figure 6:
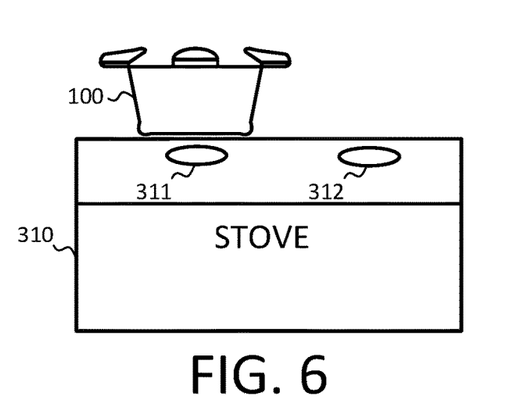
FIG. 6 shows a heater/smoker device positioned atop a stove top burner, according to an exemplary embodiment of the present subject disclosure.

FIG. 6 shows the use of a device 100 according to the present subject disclosure with a conventional stove 310. A conventional stove 310 typically has one or more burners 311, 312, which generate heat to cook. The burners may be gas, electric, induction, etc. In the present example, the device 100 is placed directly on a burner 311, as will be shown and described in detail in FIGS. 10-11. In use, the stove 310 is heated up so that the burner 311 generates heat, enough to cook food placed thereon. The heat generated from heating up the stove 310 is then directed through opening 165 into the chamber 160, and then through opening 125 of the base 120, and onto a plate or mesh screen 140 placed on the top surface of the base 120. This results in the heating and/or smoking of serveware or food placed on the base 120.

Figure 7:
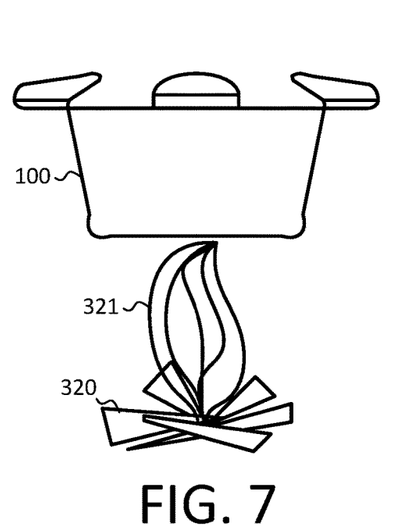
FIG. 7 shows a heater/smoker device positioned atop an open flame, according to an exemplary embodiment of the present subject disclosure.

FIG. 7 shows the use of a device 100 according to the present subject disclosure with an open flame 321, such as in a camping environment, outdoor fire pit, fireplace, or the like. In the example of a campfire, a typical fire is made by gathering and lighting a pile of wood 320 and leaves, and by using the heat and flame 321 to generate heat and smoke. In use, the campfire 321 is heated up so that it generates heat, enough to cook food thereon. The heat generated from the campfire 321 is then directed through opening 165 into the chamber 160, and then through opening 125 of the base 120, and onto a plate or mesh screen 140 placed on the top surface of the base 120. This results in the heating and/or smoking of serveware or food placed on the base 120.

Figure 8:
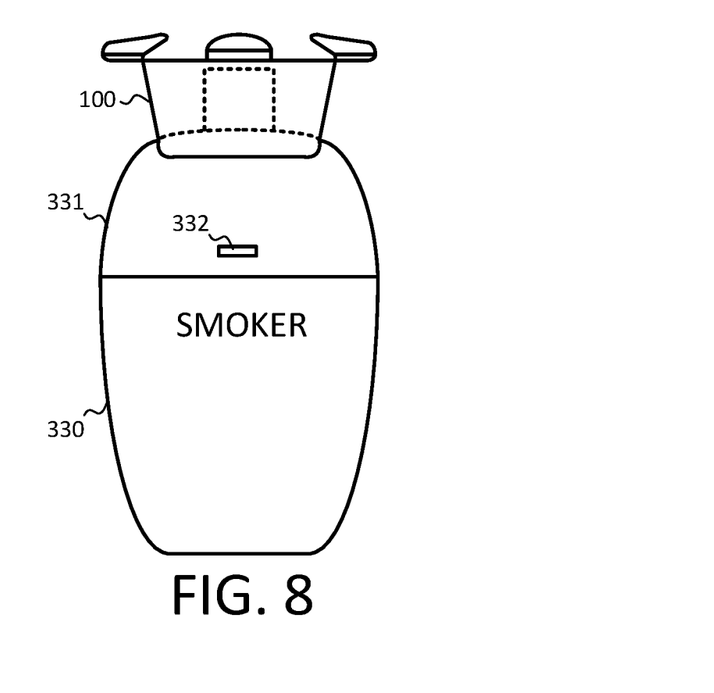
FIG. 8 shows a heater/smoker device positioned atop a smoker, according to an exemplary embodiment of the present subject disclosure.
Figure 9:
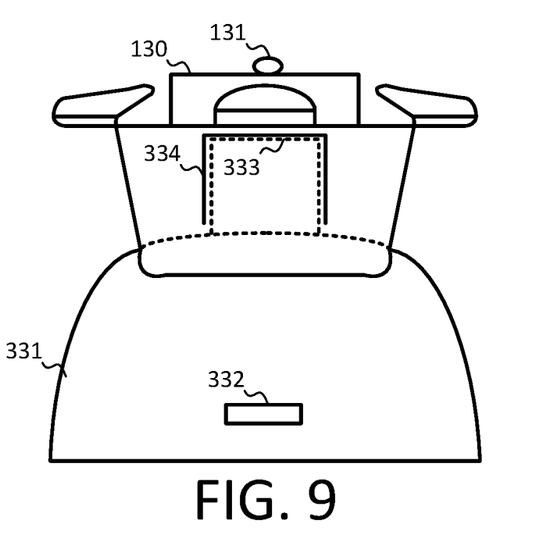
FIG. 9 shows a detailed view of a heater/smoker device positioned atop a smoker, according to an exemplary embodiment of the present subject disclosure.

FIG. 8 shows the use of a device 100 according to the present subject disclosure with an oval or egg-shaped smoker 330. The smoker 330 typically has a cover 331 with a handle 332, which is used to open and close the cover 331. The device 100 is designed to attach to a top smoke discharge port 333, which acts as a chimney to the smoker 330, as shown in FIG. 9. The chimney 332 typically has a controller 334 which allows adjustment of the rate of smoke discharge from the interior of the smoker 330. The controller 334 is also able to completely cover the discharge port 333 so that little to no smoke exits the smoker 330.

It would be appreciated by one having ordinary skill in the art, after consideration of the present disclosure, that the smoker 330 does not have to be oval or egg-shaped, but may be any other shape including, but not limited to square, rectangular, circular, etc. Further, the discharge port 333 may not be centrally located on a given smoker 330, as is shown in FIGS. 8-9, but may be positioned on a side or corner of the top of the smoker 330. In any variation, one of ordinary skill in the art would know to position the device 100 over the discharge port 333, and place further braces or brackets as needed to stabilize the position of the device 100 over the discharge port to allow full capture of the smoke being discharged from the discharge port 333.

The smoker 330 has a cooking surface (not shown), similar to cooking surface 303 of grill 300 in FIG. 5, where food is typically placed. However, in the present configuration, the device 100 is placed on top of the closed smoker 330, while interacting with the discharge port 333. The smoker 330 may be gas, charcoal, wood, other, or some combination thereof. In use, the smoker 330 is heated up so that the heat and/or smoke generated is then directed through opening chimney 333 (and optionally, controller 334) into the chamber 160, and then through opening 125 of the base 120, and onto a plate or mesh screen 140 placed on the top surface of the base 120. Since the bottom portion of device 100 has opening 165 (see FIGS. 1 and 3), the device 100 may be placed atop the chimney 333 so that the chimney 333 discharge opening coincides with the opening 125 in the base 120. This will be shown in more detail in FIGS. 10-11. A further optional opening cover 130 having a handle 131 may be placed atop opening 125 to prevent rain or debris to enter into the opening 125 or chamber 160 when the device 100 is not in use. The opening cover 130 and handle 131 is usable in all of the configurations shown in the examples presented herein.

FIGS. 10-11 show a top view of the device 100 when in use. Specially, in FIG. 10, base 120 is shown having been placed atop a heat/smoke source 350 so that the heat/smoke source is visible through opening 125 in base 120. Heat/smoke source 350 could be, for example, a grill filament (FIG. 5), a burner 311 (FIG. 6), a flame 321 (FIG. 7), a chimney 333 or controller 334 (FIG. 9), or other source. If the user of the device 100 desires to warm up a plate or other serveware, then the mesh 140 is kept separate from the base 120, as shown in FIG. 10. If the user of the device 100 desires to keep certain foods warm or to smoke the foods, then mesh 140 is slipped into the concave cavity 129 underneath the stop walls 121, 122, and 123, as shown in FIG. 11. The mesh 140 then sits atop the base 120 surface and can accommodate food placed thereon. Any smoke or heat which moves up from heat/smoke source 350 and through opening 125 is then directly in contact with the food placed upon mesh 140. This allows for warming plates, smoking, or heating of food without having to place a plate on a burner, or opening the main smoker, causing heat loss from the interior.

Figure 12:
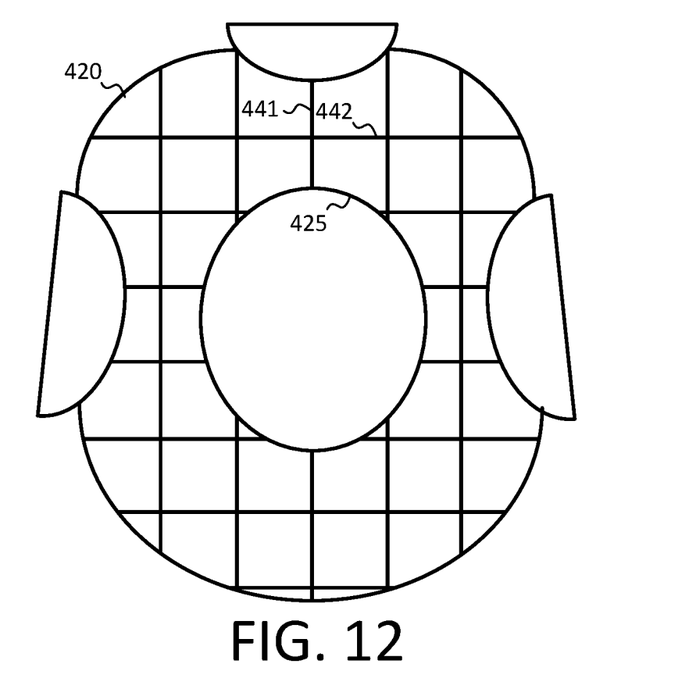
FIG. 12 shows a top view of a heater/smoker device with partial mesh body, according to another exemplary embodiment of the present subject disclosure.

FIG. 12 shows another exemplary embodiment of the present subject disclosure. In this example, the base 420 has a complete mesh top composed of vertical 441 and horizontal 442 bars, typically metallic. The mesh top has an opening 425, similar to the opening 125 of FIG. 1. In this example, the base 420 may accommodate serveware for heating, but may need a separate mesh 140, like that shown in FIG. 2, in order to smoke foods, because there's not enough space on the mesh surface 120 to place food.

Figure 13:
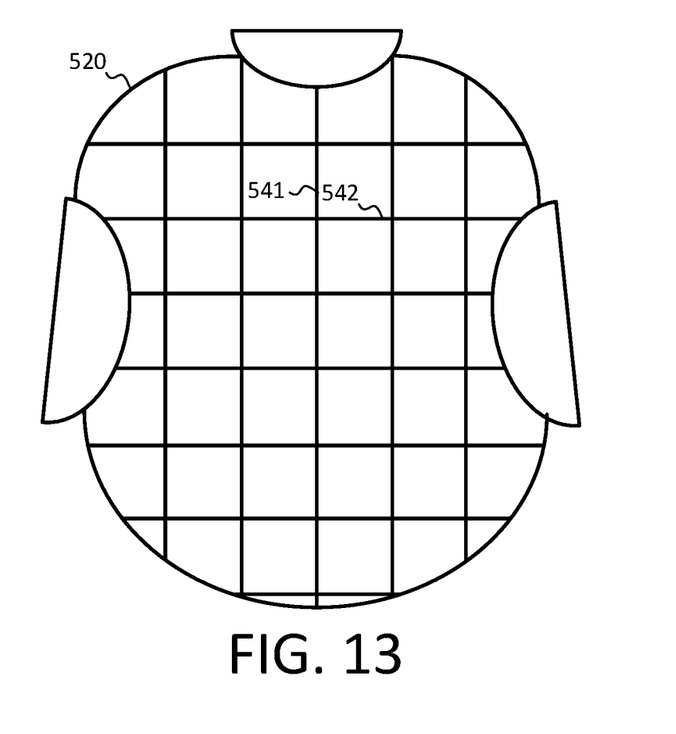
FIG. 13 shows a top view of a heater/smoker device with full mesh body, according to another exemplary embodiment of the present subject disclosure.

FIG. 13 shows yet another exemplary embodiment of the present subject disclosure. In this example, the base 520 has a complete mesh top composed of vertical 541 and horizontal 542 bars, typically metallic. The mesh top covers the entire base surface. In this example, the base 520 may accommodate serveware for heating, and foods for heating or smoking, without the need for a separate mesh 14, like that shown in FIG. 2. It should be noted that the optional surface tops 420 (FIG. 12) and 520 (FIG. 13) may be substituted for any of the other bases 120/220 of the devices 100/200 shown and presented in FIGS. 1-11.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A device for heating/smoking, the device comprising:
a base portion having a substantially solid planar surface with a central aperture;
a chamber having a top side attached to the base portion, and a bottom side having a central aperture larger than the central aperture of the base portion; and
stop walls positioned on a top side of the base portion to serve as stopping points for plates positions thereon;
wherein each of the stop walls is U-shaped and has a concave portion;
wherein the stop walls comprise three U-shaped stop walls, including a top stop wall and two side stop walls such that a serveware is slid onto the top side of the base portion from a side so that the concave portions of the two U-shaped side stop walls entrap opposite sides of the serveware and a first end of the serveware is entrapped by the concave portion of the U-shaped top stop wall;
wherein the base portion central aperture and the chamber bottom side central aperture have centers along a vertical axis of the device; and
wherein the chamber aperture is adapted to be placed upon a chimney output of a source for heat and/or smoke, wherein heat and/or smoke is directed through the chamber aperture, into the chamber, through the base aperture, and onto the base portion, to heat and/or smoke items placed thereon.

2. The device in claim 1, wherein the items placed on the base portion include serveware.

3. The device in claim 2, wherein the serveware include plates.

4. The device in claim 1, further comprising a flat planar mesh, which is placed on the base portion.

5. The device in claim 4, wherein the mesh is adapted so that food is placeable thereon.

6. The device in claim 1, wherein the stop walls are parallel.

7. The device in claim 1, wherein the concave portions of two of the U-shaped stop walls face each other.

8. The device in claim 1, further comprising a mesh screen which is adapted to fit within a space formed by the three U-shaped stop walls.

9. The device in claim 1, further comprising draining apertures in the solid planar surface of the base portion to allow runoff of liquid thereon, wherein the draining apertures are substantially smaller than the central aperture.

10. The device in claim 1, further comprising a pocket positioned within the chamber, and adapted to hold scenting material.

11. The device in claim 1, further comprising a temperature gauge positioned on a wall portion of the chamber.

12. A device for heating/smoking, the device comprising:
a base portion having a substantially solid planar surface with a central aperture, and a plurality of stop walls positioned on a top side, which are adapted to secure a serveware or mesh placed thereon; and
wherein each of the stop walls is U-shaped and has a concave portion; and
wherein the stop walls comprise three U-shaped stop walls, including a top stop wall and two side stop walls such that a serveware is slid onto the top side of the base portion from a side so that the concave portions of the two U-shaped side stop walls entrap opposite sides of the serveware and a first end of the serveware is entrapped by the concave portion of the U-shaped top stop wall;

a chamber attached to the base portion, having a bottom side with a central aperture larger than the central aperture of the base portion;

wherein the base portion central aperture and the chamber bottom side central aperture have centers along a vertical axis of the device; and wherein the chamber aperture is adapted to be placed upon a chimney output of a source for heat and/or smoke, wherein heat and/or smoke is directed through the chamber aperture, into the chamber, through the base aperture, and onto the base portion, to heat and/or smoke items placed thereon.

13. The device in claim 12, wherein the stop walls are parallel.

14. The device in claim 12, wherein the concave portions of two of the U-shaped stop walls face each other.

\* \* \* \* \*